United States Patent Office 3,403,157
Patented Sept. 24, 1968

3,403,157
BENZO[6,7]CYCLOHEPTA[1,2,3-d,e]ISOQUINOLINE DERIVATIVES
Leslie G. Humber, Dollard des Ormeaux, Quebec, and Martin A. Davis, Montreal, Quebec, Canada, assignors to American Home Products Corporation, New York, N.Y., a corporation of Delaware
No Drawing. Filed Sept. 1, 1965, Ser. No. 484,440
4 Claims. (Cl. 260—288)

ABSTRACT OF THE DISCLOSURE

There are disclosed herein 1,2,3,8,9-pentahydro-3aH-benzo[6,7]cyclohepta[1,2,3-d,e]isoquinoline and its N-benzyl, N-ethyl, and N-(γ-diethylaminopropyl) derivatives. The compounds possess anti-bacterial properties and methods for their preparation and use are also disclosed.

This invention relates to certain novel polynuclear isoquinoline derivatives which are characterized by possession of the novel 1,2,3,8,9-pentahydro-3aH-benzo[6,7]cyclohepta[1,2,3-d,e]isoquinoline ring system represented generically by Formula I

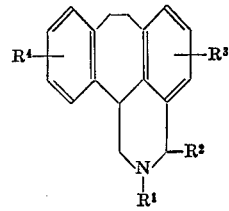

in which $R^1$, $R^2$, $R^3$ and $R^4$ may be hydrogen, or alternatively $R^1$ may be lower alkyl or di-(lower alkyl)-aminoalkyl, $R^2$ may be alkyl, phenyl or substituted phenylalkyl, and $R^3$ and $R^4$ may represent one or more substituents on an aromatic ring, such substituents including lower alkyl, halogen, hydroxyl, alkylthio, and trihalomethyl.

This invention also relates to processes for the preparation of the pharmacologically active compounds described herein, and to intermediates used in their preparation. These processes are illustrated schematically below and are described further in the examples.

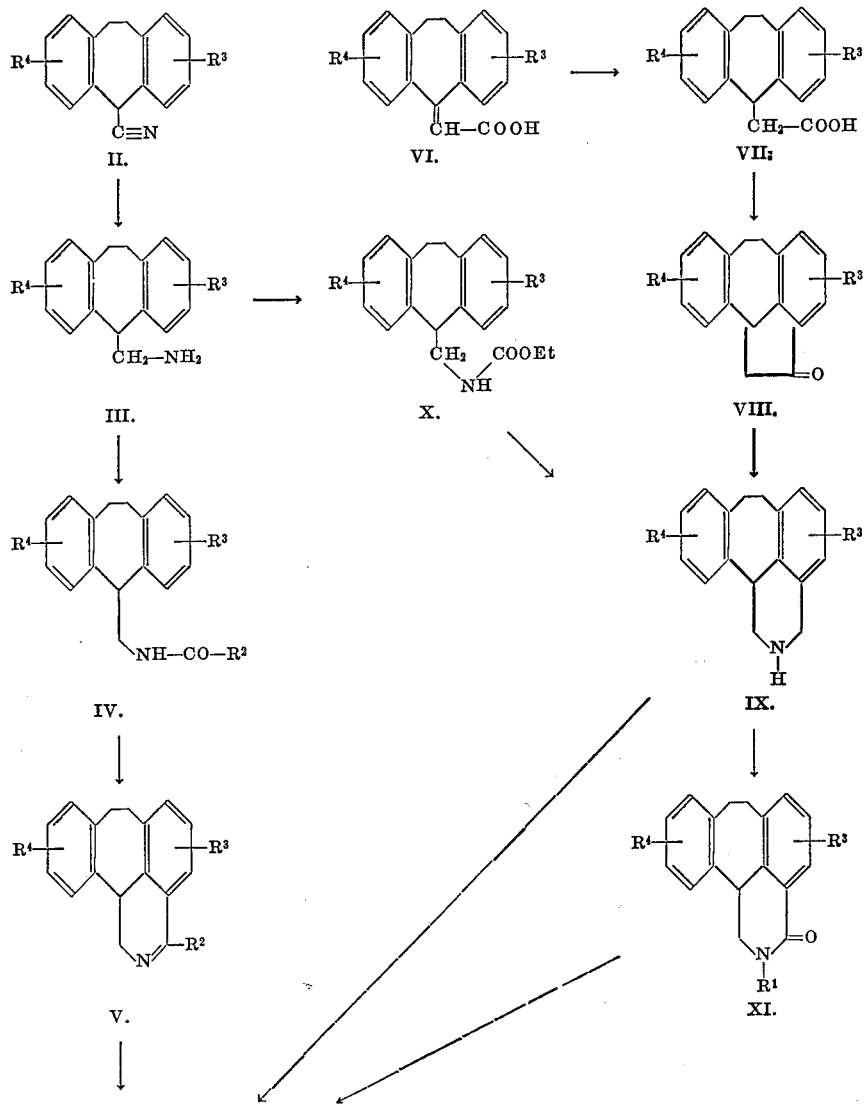

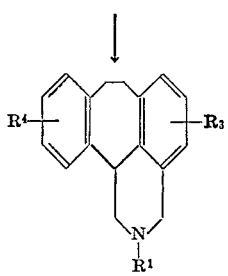

I.

Thus, Compound III may be prepared by two processes from 10,11-dihydro-5H-dibenzo[a,d]cycloheptane-5-ylnitrile (II, $R^3=R^4=H$) (Davis et al., J. Med. Chem., 6,251 (1963)). Firstly, treatment of II with hydrogen in the presence of ammonia and a metal catalyst at elevated pressure, yields after a suitable work-up procedure compound III ($R^3=R^4=H$). Alternatively, compound II may be treated with a mixture of lithium aluminum hydride and aluminum chloride in an ether solution, again to yield III ($R^3=R^4=H$). The intermediate III may then be reacted with a suitable acylating agent to yield compounds IV or X. When the acylating agent is ethyl chloroformate, intermediate X results, and when the acylating agent is selected from the group consisting of suitably substituted esters, acids, and anhydrides or acid halides, intermediate IV results, wherein $R^2$, $R^3$ and $R^4$ are defined as in Formula I, above.

Intermediates IV and X obtained as described above, may then be subjected to the action of a suitable cyclising agent, such as, for example polyphosphoric acid, phosphorus pentoxide or phosphorus oxychloride to yield, respectively, the dihydroisoquinoline derivative V, and the isoquinolinone derivative IX, both of which may be reduced to yield compound I with $R^1=H$ and with $R^2$, $R^3$ and $R^4$ having the significance defined above, the above-mentioned reduction being effected by the use of a suitable reducing agent, e.g., one selected from the group consisting of lithium aluminum hydride, alkali metal borohydrides, sodium and alcohol, and hydrogen in the presence of a noble metal catalyst. Alternatively, the isoquinolinone intermediate, IX, may be reacted with the appropriate alkyl, dialkylaminoalkyl or aralkyl halide, $R^1$—X, wherein X is a halogen and $R^1$ is defined as above, in the presence of a basic agent such as an alkali metal hydride to yield the corresponding derivative of Formula XI, which may subsequently be reduced as described above, to yield the corresponding isoquinoline derivatives of this invention I, wherein $R^1$ represents the desired substituent on the nitrogen and $R^2$ represents hydrogen.

The intermediate isoquinolinone derivative IX may also be prepared by alternate methods. Thus, the amine III may be treated successively with phosgene and with aluminum chloride in a suitable solvent, to yield compound IX.

Or, the compounds of Formula IX may be prepared by reducing 10,11-dihydro-5H-dibenzo[a,d]cyclohepten-5-ylidenacetic acid, VI, ($R^3=R^4=H$) described by Winthrop et al., J. Org. Chem., 27,230 (1962) with nascent hydrogen or with hydrogen in the presence of a catalyst to obtain 10,11-dihydro-5H-dibenzo[a,d]cyclohepten-5-ylacetic acid (VII, $R^3=R^4=H$). Compound VII may be cyclodehydrated to yield 2-oxo-1,6,7,11b-tetrahydro-2H-dibenz[cd,h]azulene (VIII, $R^3=R^4=H$) by the use of a suitable reagent, such as, for example, anhydrous liquid hydrogen fluoride, polyphosphoric acid, and phosphorus pentoxide.

The ketone VIII is treated with hydrazoic acid in a suitable solvent. Optionally, the hydrazoic acid may be generated in situ from an alkali metal azide salt by the use of a suitable acid, such as, for example, sulphuric acid, or trichloroacetic acid. Suitable solvents for the reaction include inert solvents such as chloroform, toluene, ether, or an excess of one of the above acids may be utilized as solvent. Quenching the reaction with water, removal of excess acid and extraction with a water-immiscible solvent such as, for example, chloroform yields 1,2,3,8,9 - pentahydro-3aH-benzo[6,7]cyclohepta [1,2,3-d, e]isoquinolin-1-one (IX, $R^3=R^4=H$).

The compounds of this invention of Formula I possess useful pharmacological properties as antibacterial agents, being active against *Staphylococcus pyogenes* (both pencillin-sensitive and pencillin-resistant strains), *Sarcina lutea*, *Strepococcus fecalis*, and *Escherichia coli*. As antibacterial agents for topical use the compounds of Formula I, may be formulated as solutions, creams, or lotions with pharmacologically acceptable vehicles containing from 0.1 to 1.0 percent of the active ingredient. Such formulations may be applied topically to the site of infection as required.

EXAMPLE 1

10,11-dihydro-5H-dibenzo[a, d]cyclohepten-5-yl methylamine (III, $R^3=R^4=H$)

(a) 10,11 - dihydro - 5H - dibenzo[a, d]cyclohepten-5-yl nitrile II, $R^3=R^4=H$ (109.5 gm.), dissolved in 1500 ml. of ether is added dropwise over 3 hours to a mixture of lithium aluminum hydride (20.9 gm.) and aluminum chloride (73.3 gm.) in 1250 ml. of ether. The mixture is refluxed for 2 hours and allowed to remain at 22° for 16 hours. Concentrated hydrochloric acid (200 ml.) and water (1500 ml.) are added to the reaction mixture and the ether is removed by distillation. The aqueous residue is heated until all solids are dissolved, filtered and cooled to yield the hydrochloride salt of the title compound, M.P.>295° when crystallized from a methanol-ethyl acetate mixture. The title compound is obtained from its salt by the conventional procedure. It is a light straw-colored oil, B.P. 150–154° at 0.2–0.3 mm., $n_D^{23}$ 1.6122.

(b) 10,11 - dihydro - 5H - dibenzo[a, d] cyclohepten-5-yl nitrile (II, $R^3=R^4=H$, 20 gm.) is dissolved in methanol (200 ml.) containing liquid ammonia (18 gm.) and hydrogenated in the presence of Raney nickel (10 mg.) for 15 hours at 60° and at a pressure of 700–800 pounds per square inch. The cooled reaction mixture is filtered to remove the catalyst and fractionally distilled to yield the title compound possessing physical properties identical to those of the sample prepared as described above part (a).

EXAMPLE 2

N-carbethoxy 10,11-dihydro-5H-dibenzo[a, d]cyclohepten-5-yl methylamine (X, $R^3=R^4=H$)

To 10,11 dihydro - 5H - dibenzo[a, d]cyclohepten-5-yl methylamine (III, $R^3=R^4=H$ 6.7 gm.) dissolved in 80 ml. of ethylene dichloride is added 33 ml. of 1.0 N aqueous sodium hydroxide. The mixture is cooled to 0° and ethyl chloroformate (3.58 gm.) dissolved in 40 ml. of ethylene dichloride is added over 15 minutes. The reaction mixture is kept at 0° for 15 minutes, then at 22° for 90 minutes. The organic phase is washed successively with water, 2 N hydrochloric acid, water, 5% aqueous sodium bicarbonate and saturated aqueous sodium chloride, dried with sodium carbonate and evaporated to yield the title compound as a solid $\nu_{max}^{CHCl_3}$ 1715 cm.$^{-1}$ M.P. 77–79° when crystallized from an ethyl acetate-hexane mixture.

EXAMPLE 3

1,2,3,8,9-pentahydro-3aH-benzo[6,7]cyclohepta [1,2,3-d, e]isoquinolin-1-one (IX, $R^3=R^4=H$)

(a) N - carbethoxy 10,11 - dihydro-5H-dibenzo[a, d] cyclohepten-5-yl methylamine (X, $R^3=R^4=H$, 1.0 gm.) is dissolved in 20 gm. polyphosphoric acid and heated at 120–150° for 2 hours. The reaction mixture is distributed between water and chloroform. The organic phase is washed with dilute aqueous sodium hydroxide and with water. Drying and evaporation yields a residue which on crystallization from a chloroform-hexane mixture gives the title compound IX with M.P. 173–175° C., $\nu_{max.}^{CHCl_3}$ 1672 cm.$^{-1}$ (b) N - carbethoxy 10,11 - dihydro - 5H - dibenzo[a,d]cyclohepten-5-yl methylamine (X, R$^3$=R$^4$=H, 1.0 gm.) is dissolved in xylene (25 ml.) containing phosphorus pentoxide (5.0 gm.) and phosphorus oxychloride (10.0 gm.). The mixture is refluxed for 3 hours, benzene added and the mixture washed with 5% aqueous sodium hydroxide and with water. The organic phase is dried and evaporated to yield the title compound as a crystalline solid from a chloroform-hexane mixture, having identical properties to samples prepared according to part (a) above.

(c) 10,11 - dihydro - 5H - dibenzo[a, d] cyclohepten-5-yl methylamine (III, R$^3$=R$^4$=H, 11.15 gm.) is dissolved in 60 ml. of chlorobenzene and the mixture is saturated with anhydrous hydrogen chloride. Phosgene is bubbled through the suspension for 15 minutes and then the mixture is stirred at room temperature for two hours. The chlorobenzene solution is filtered and the solvent is removed in vacuo. The residue is dissolved in 25 ml. of nitrobenzene and treated with anhydrous aluminum chloride (3.2 gm.) followed by heating at 60–70° for one hour. Water is added, the organic phase is diluted with chloroform, dried with sodium sulfate and evaporated to dryness in vacuo. The residue is crystallized from a chloroform-hexane mixture to yield the title compound having physical properties identical to those of samples prepared according to parts (a) and (b) above.

EXAMPLE 4

1,2,3,8,9-pentahydro-3aH-benzo[6,7]cyclohepta[1,2,3-d,e]isoquinoline (I, R$^1$=R$^2$=R$^3$=R$^4$=H)

(a) 1,2,3,8,9-pentahydro-3aH - benzo[6,7]cyclohepta[1,2,3-d,e]isoquinolin - 1 - one (IX, R$^3$=R$^4$=H, 2.1 gm.) and lithium aluminum hydride (1.0 g.) are combined in tetrahydrofuran (40 ml.) and refluxed for 16 hours. The excess lithium aluminum hydride is destroyed by addition of water and the organic phase is separated after removal of precipitated inorganic salts by filtration. It is dried and evaporated to dryness to yield the title compound (I), $\nu_{max.}^{CHCl_3}$ 1485 and 1040 cm.$^{-1}$ The hydrochloride salt is prepared from the above base with hydrogen chloride in ether solution; it is crystallized from a methanol-ether mixture and has M.P. 250–252°.

(b) 3,8,9 - trihydro-3aH - benzo[6,7]cyclohepta[1,2,3-d,e]isoquinoline (V, R$^2$=R$^3$=R$^4$=H, 2.0 gm.) prepared as described in Example 6, is dissolved in ethanol (25 ml.) and sodium borohydride (1.0 gm.) added. The mixture is refluxed for 4 hours then evaporated to dryness. The residue is distributed between chloroform and water. Treatment of the chloroform phase in the conventional manner yields the title compound possessing identical physical properties to the sample prepared as described under (a), above.

EXAMPLE 5

N-formyl 10,11-dihydro-5H-dibenzo[a,d]cyclohepten-5-yl methylamine (IV, R$^2$=R$^3$=R$^4$=H)

(a) 10,11-dihydro - 5H - dibenzo[a,d]cyclohepten-5-yl methylamine (III, R$^3$=R$^4$=H, 45 gm.) is dissolved in ethyl formate (150 ml.) for 2 hours. The excess ethyl formate is removed by distillation and the residue is dissolved in benzene and washed with 2 N hydrochloric acid. The organic phase is dried with sodium carbonate, evaporated and the residue crystallized from an ethanol-ether mixture to yield the title compound, M.P. 109–111°, $\nu_{max.}^{CHCl_3}$ 1670 cm.$^{-1}$ (b) a mixture of formic acid (2.15 ml.) and acetic anhydride (5.08 ml.) is heated at 50–60° for 2 hours. The mixture is cooled to 27° and 10,11-dihydro-5H-dibenzo[a,d]cyclohepten - 5 - yl methylamine (III, R$^3$=R$^4$=H, 5.6 gm.) is added with vigorous stirring over 15 minutes. The mixture is stirred overnight at room temperature then poured onto cracked ice. The resulting white precipitate is dissolved in chloroform and washed with dilute sodium bicarbonate solution then with water. Drying (Na$_2$SO$_4$) and evaporation of the solvent yields a solid residue which on crystallization from an ethanol-ether mixture yields the title compound possessing physical properties identical to those of the sample prepared as described under (a), above.

EXAMPLE 6

3,8,9-trihydro-3aH-benzo[6,7]cyclohepta[1,2,3-d,e]isoquinoline (V, R$^2$=R$^3$=R$^4$=H)

N-formyl 10,11-dihydro - 5H - dibenzo[a,d]cyclohepten-5-yl methylamine (IV, R$^2$=R$^3$=R$^4$=H, 1.26 gm.) is added to polyphosphoric acid (15 gm.) at 110°. The temperature of the mixture is raised to 150±5° and kept there for 1 hour. The mixture is poured onto crushed ice and the resultant precipitate is dissolved in chloroform. Drying (Na$_2$SO$_4$) and removal of the solvent in vacuo yields a residue which on crystallization from benzene yields the title compound, M.P. 109–110°, $\nu_{max.}^{CHCl_3}$ 1640 cm.$^{-1}$

EXAMPLE 7

N - benzyl - 1,2,3,8,9 - pentahydro-3aH-benzo[6,7]cyclohepta[1,2,3-d,e]isoquinolin-1-one (XI, R$^1$=benzyl, R$^3$=R$^4$=H)

1,2,3,8,9-pentahydro-3aH - benzo[6,7]cyclohepta[1,2,3-d,e]isoquinolin - 1 - one (IX, R$^3$=R$^4$=H, 5.0 gm.) is dissolved in 1,2-dimethoxyethane (75 ml.) and sodium hydride (0.5 gm.) is added. The mixture is stirred at 50° for three hours and benzyl chloride (2.5 gm.) dissolved in 1,2-dimethoxyethane (10 ml.) is added at room temperature. The mixture is refluxed for 4 hours, evaporated to dryness and distributed between chloroform and water. The chloroform phase yields the title compound XI on crystallization from ethanol.

By working in a similar manner, but using instead of benzyl chloride, ethyl chloride or α-diethylaminopropyl chloride the corresponding compounds, N-ethyl-1,2,3,8,9 - pentahydro-3aH-benzo[6,7]cyclohepta[1,2,3 - d,e]isoquinolin-1-one and N - (α-diethylaminopropyl)-1,2,3,8,9-pentahydro - 3aH - benzo[6,7]cyclohepta[1,2,3 - d,e]isoquinolin-1-one, are obtained.

EXAMPLE 8

10,11-dihydro-5H-dibenzo[a,d]cyclohepten-5-ylactic acid (VII)

10,11 - dihydro - 5H-dibenzo[a,d]cyclohepten-5-ylidenacetic acid (VI, 29.0 gm.) is dissolved in 125 ml. of anhydrous ethanol and 2.0 gm. of 10% palladium on charcoal is added. The mixture is hydrogenated at 40° and 50 p.s.i. The theoretical uptake of hydrogen is observed after nine hours. At the end of the hydrogenation, the mixture is allowed to stand at 22° C., overnight. Benzene (150 ml.) and anhydrous ethanol (150 ml.) are added to dissolve some solid, and the catalyst is removed by filtration, the filtrate evaporated in vacuo and the residue dissolved in benzene. The title compound (VII) separates upon cooling and is isolated by filtration, M.P. 162–163.5°.

EXAMPLE 9

2-oxo-1,6,7,11b-tetrahydro-2H-dibenz[cd,h] azulene (VIII)

10,11 - dihydro - 5H - dibenzo[a,d]cyclohepten-5-yl-acetic acid (VII, 18.5 gm.) is mixed with 670 gm. of polyphosphoric acid and heated with stirring on the steam bath for five hours, allowed to remain at 22° C. for ten hours, and then poured onto cracked ice and extracted with benzene. The dark benzene phase is washed with dilute aqueous sodium hydroxide, then with water to yield an amber oil. Recrystallization from benzene yields the title compound (VIII, M.P. 219–220°, which may be purified by high vacuum sublimation.

Alternatively, 10,11 - dihydro - 5H - dibenzo[a,d]cyclohepten-5-ylacetic acid (VII) is dissolved in 100 ml. of anhydrous hydrogen fluoride. The solution has a blue color and is allowed to evaporate to dryness overnight. The residue is distributed between chloroform and 10% aqueous sodium hydroxide. The red chloroform phase is treated with charcoal (Nuchar), dried with anhydrous sodium sulfate, and evaporated to yield a yellow solid, M.P. 205–215° C., which is triturated with a mixture of 100 ml. of hot hexane and 10 ml. of benzene, cooled, and filtered to yield the title compound (VIII) M.P. 217.5–219° C., identical with the compound as obtained above.

EXAMPLE 10

1,2,3,8,9-pentahydro-3aH-benzo[6,7]cyclohepta[1,2,3-d,e]isoquinolin-1-one (IX)

(a) 2-oxo-1,6,7,11b-tetrahydro-2H-dibenz[cd,h] azulene (VIII, 4.5 g.) is dissolved in molten trichloroacetic acid (45 g.) and sodium azide (2.4 g.) is added. The mixture is heated on the steam bath for 30 minutes and then allowed to remain at 22° for 16 hours. It is then poured into cold water, made alkaline with ammonium hydroxide and extracted with chloroform. The chloroform phase is dried with anhydrous sodium sulfate and evaporated to dryness to yield the title compound IX which is crystallized from a chloroform-hexane mixture and has M.P. 173–175° and $$\nu_{max.}^{CHCl_3} \ 1672 \ cm.^{-1}$$

EXAMPLE 11

N - benzyl - 1,2,3,8,9 - pentahydro-3aH-benzo[6,7]cyclohepta[1,2,3 - d,e]isoquinoline (1, $R^1$=benzyl, $R^2$=$R^3$=$R^4$=H)

N - benzyl - 1,2,3,8,9 - pentahydro - 3aH - benzo[6,7]cyclohepta[1,2,3 - d,e]isoquinolin - 1 - one, obtained as in Example 7, (XI, $R^1$=benzyl, $R^2$=$R^3$=$R^4$=H, 2.1 g.) and lithium aluminum hydride (1.0 g.) are combined in tetrahydrofuran (40 ml.) and refluxed for 16 hours. The excess lithium hydride is destroyed by addition of water and the organic phase is separated after removal of precipitated inorganic salts by filtration. It is dried and evaporated to dryness to yield the title compound (1, $R^1$=benzyl, $R^2$=$R^3$=$R^4$=H), which is purified by crystallization from ethanol.

In the same manner, by using starting materials the corresponding N-ethyl or N-γ-diethylaminopropyl) derivatives obtained as in Example 7, the corresponding N-ethyl and N-(γ-diethylaminopropyl)-1,2,3,8,9-pentahydro - 3aH - benzo[6,7]cyclohepta[1,2,3 - d,e]isoquinolines are also obtained.

We claim:
1. 1,2,3,8,9 - pentahydro - 3aH - benzo[6,7]cyclohepta[1,2,3 - d,e]isoquinoline.
2. N - benzyl - 1,2,3,8,9 - pentahydro - 3aH - benzo[6,7]cyclohepta[1,2,3 - d,e]isoquinoline.
3. N - ethyl - 1,2,3,8,9 - pentahydro - 3aH - benzo[6,7]cyclohepta[1,2,3 - d,e]isoquinoline.
4. N - (γ - diethylaminopropyl) - 1,2,3,8,9 - pentahydro - 3aH - benzo[6,7]cyclohepta[1,2,3 - d,e]isoquinoline.

References Cited

UNITED STATES PATENTS

| | | | |
|---|---|---|---|
| 2,974,143 | 3/1961 | Schmidt et al. | 260—286 |
| 3,258,488 | 6/1966 | Judd et al. | 260—283 X |

NICHOLAS S. RIZZO, *Primary Examiner.*

DONALD G. DAUS, *Assistant Examiner.*